March 7, 1944.    J. M. TYLER    2,343,426
VIBRATION SUPPRESSING ENGINE MOUNT
Filed Jan. 29, 1942    2 Sheets-Sheet 1

INVENTOR
John M. Tyler
BY
Harris G. Luther
ATTORNEY

March 7, 1944. J. M. TYLER 2,343,426
VIBRATION SUPPRESSING ENGINE MOUNT
Filed Jan. 29, 1942 2 Sheets-Sheet 2
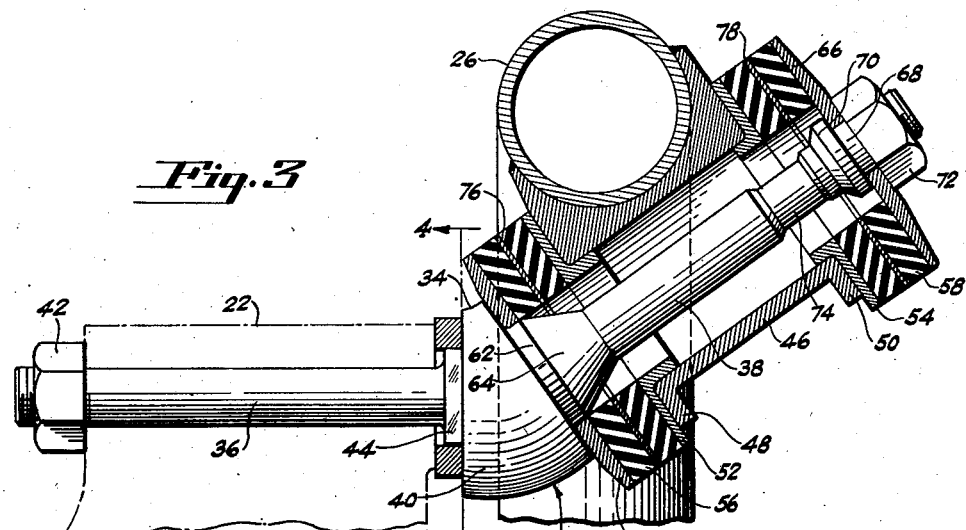
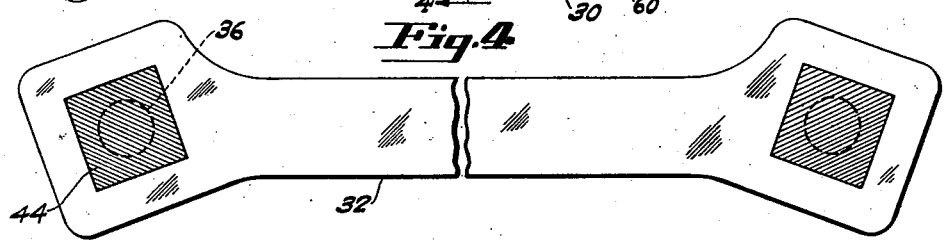
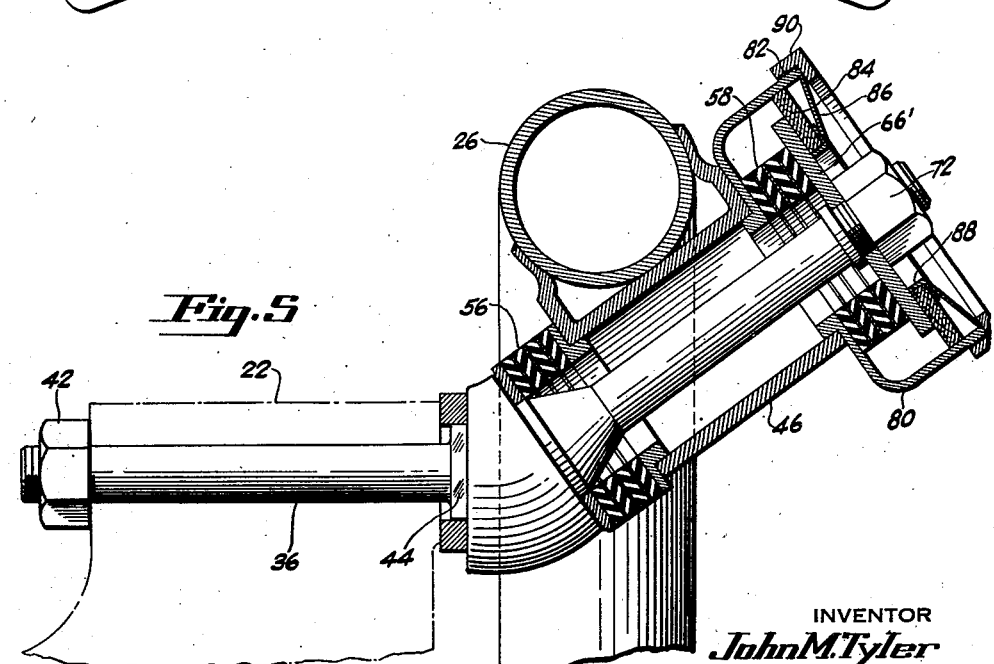
INVENTOR
John M. Tyler
BY Harris G. Luther
ATTORNEY Patented Mar. 7, 1944

2,343,426

UNITED STATES PATENT OFFICE 2,343,426

VIBRATION SUPPRESSING ENGINE MOUNT

John M. Tyler, West Hartford, Conn., assignor to United Aircraft Corporation, East Hartford, Conn., a corporation of Delaware Application January 29, 1942, Serial No. 428,640

17 Claims. (Cl. 248—5)

This invention relates to improvements in flexible engine mounts and has particular reference to an improved vibration suppressing mount for the power plant of an airplane.

An object of the invention resides in the provision of an improved flexible mount of the character indicated which will firmly support a power plant, such as an aircraft engine and propeller, in operative position and will, at the same time, suppress the transmission of power plant vibration to the structure of the airplane.

A further object resides in the provision of a simplified resilient engine mount of the character indicated which may be conveniently applied to existing engine and mount ring structures originally designed for a rigid type of engine mount.

A still further object resides in the provision of an improved resilient engine mount of the character indicated including a plurality of individual mounting brackets in which each bracket has at least two pads or spring members of resilient material spaced apart in a manner to distribute the vibrational forces imposed on the brackets between the two spaced apart resilient members.

An additional object resides in the provision in an improved resilient engine mount of the character indicated of means for relieving the mount attaching elements on the engine from a large portion of the torque induced loads which would otherwise be applied thereto.

Other objects and advantages will be more particularly pointed out hereinafter or will become apparent as the description proceeds.

In the accompanying drawings, in which like reference numerals are used to designate similar parts throughout, there are illustrated two slightly modified forms, both of which are suitable mechanical embodiments for the purpose of disclosing the invention. The drawings, however, are for the purpose of illustration only and are not to be taken as limiting or restricting the invention since it will be apparent to those skilled in the art that various changes in the illustrated embodiments may be resorted to without in any way exceeding the scope of the invention.

In the drawings,

Fig. 3 is a sectional view on an enlarged scale on the line 3—3 of Fig. 2 showing one of the engine mount brackets in detail.

Fig. 4 is a plan view on an enlarged scale of one of the bracket connecting elements shown in Fig. 2, and Fig. 5 is a detail view similar to Fig. 3 showing a somewhat modified form of bracket constructed according to the invention.

Figure 1:
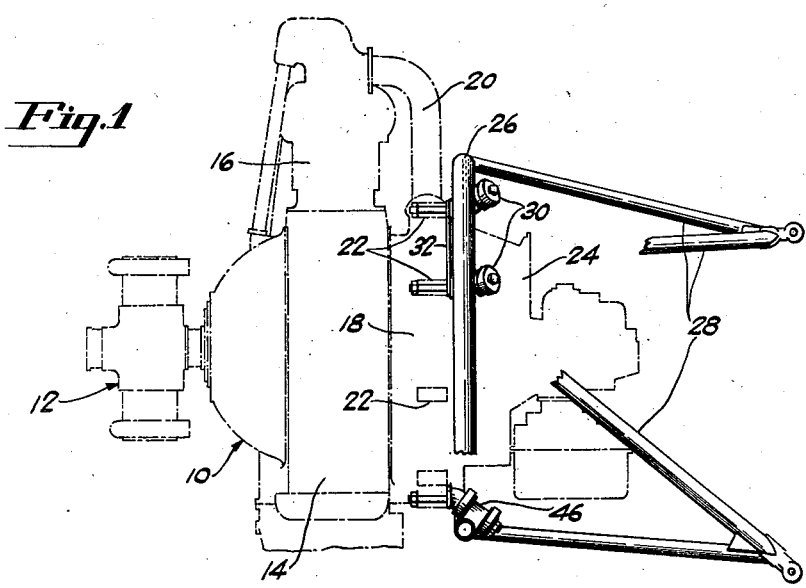
Fig. 1 is a somewhat diagrammatic elevational view of an engine and an engine supporting frame showing the application thereto of resilient mount units constructed according to the invention.

Referring to the drawings in detail, the numeral 10 generally indicates an internal-combustion engine such as a radial air-cooled engine conventionally employed for the propulsion of aircraft, and the numeral 12 generally indicates a propeller supported and driven by the engine 10. The engine has a crankcase section 14 from which project a plurality of radially arranged cylinders 16, and has a blower section 18 from which intake pipes 20, lead to the respective cylinders. This blower section is provided exteriorally thereof with a plurality of apertured angularly spaced lugs or bosses, as indicated at 22, so arranged that the center lines of the apertures are substantially parallel to the axis of rotation of the engine. The blower section 18 is conventionally formed of a relatively light weight metal, such as aluminum or magnesium alloy and the bosses 22 may be formed integrally with the blower section when the blower section is cast or forged. If, as in many cases, the blower section is formed of a cast aluminum alloy, the structural strength of this material is such that care must be taken that the bosses 22 are not overloaded.

Surrounding the accessory portion 24 of the engine, immediately to the rear of the bosses 22, is a mount ring 26 held by a frame 28 which may be secured to the structure of the airplane in a manner well known to the art. The ring 26 is substantially concentric with the axis of rotation of the engine and has a diameter somewhat greater than the diameter of the series of mounting bosses 22.

The engine 10 is secured to the ring 26 by a plurality of mounting brackets, as indicated at 30 and particularly illustrated in Figs. 3 and 5.

Figure 2:
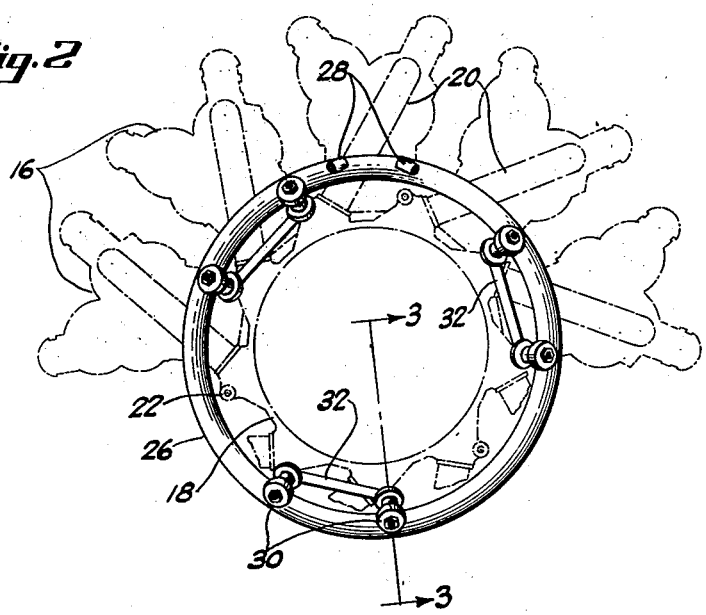
Fig. 2 is a rear elevational view of the engine and engine mount shown in Fig. 1.

It has been found that six brackets of the character indicated is a sufficient number to provide adequate support for the engine and it has been found convenient to arrange these brackets in pairs, as is particularly shown in Fig. 2. In the arrangement shown, the center lines of two brackets of the same pair are approximately forty degrees apart while the center lines of adjacent brackets of two different pairs are approximately eighty degrees apart. This arrangement, however, is by way of illustration only and the invention is in no way limited to the particular arrangement of brackets shown in Fig. 2. The engine illustrated is a nine cylinder single row engine of a conventional type and, as is customary, is provided with nine bosses or lugs 22 disposed on the blower section receptacles of the respective intake pipes 20. In providing the present mounting arrangement it has been found convenient to omit the use of three of these nine bosses. As is clearly shown in Fig. 2, the two brackets of each pair are connected together by a link member 32, particularly illustrated in Fig. 4, the end portions of which are provided with non-circular apertures which fit non-circular portions on the bracket stems to prevent twisting of the bracket stems in the bosses 22 and thereby relieve these bosses from some of the torsionally induced strain incident to engine operation.

Referring now to Fig. 3 for a detailed description of a bracket member, it will be noted that the stem 34 comprises two bolt or spindle portions 36 and 38 having intersecting center lines disposed at an angle to each other such that, when the portion 36 is in place in the aperture of the corresponding boss 22 the center line of the portion 38 when extended intersects the axis of rotation of the engine at an oblique angle of approximately 45°. Between the adjacent ends of the portions 36 and 38 there is an enlarged portion 40 which has corresponding radial shoulders perpendicular to the center lines of the portions 36 and 38. The portion 36 is screw threaded at its end opposite the enlargement 40 and provided with a nut 42 for clamping this spindle or bolt portion in the boss 22. Adjacent to the enlargement 40 the portion 36 is provided with a shoulder 44 of non-circular outline which fits the aperture in the end of the link member 32 so that the link member 32 acts as a wrench to prevent rotation of the bracket member when torque forces are imposed thereon. The spindle portion 38 extends through a hollow sleeve 46 secured to the mounting ring 26 by suitable means, such as welding or brazing, at an angle such that its center line substantially coincides with the center line of the spindle portion 38. The sleeve 46 is provided at its opposite ends with outwardly projecting flange portions, as indicated at 48 and 50, and upon these flange portions are seated plate members 52 and 54 respectively to which the resilient pads 56 and 58 are bonded. Each of the plate members 52 and 54 is provided with an aperture through which the spindle portion 38 extends and with a boss which surrounds the aperture and projects within the sleeve member 46 to rigidly locate these plate members with respect to the sleeve. These apertures are of a diameter considerably greater than the outside diameter of the portion of the spindle member which they overlie to allow a relatively large clearance for movement of the spindle member 38 relative to the sleeve 46. Each of the pads 56 and 58 is a relatively flat member with substantially parallel major surfaces and a generally circular outline. As pointed out above, one major surface of the pad 56 is bonded to the plate member 52 while one of the major surfaces of the pad 58 is bonded to the plate member 54. The other major surface of the pad 56 is bonded to a plate or washer member 60 which is concentric with the plate 52 and the spindle 38 and is provided with an aperture which closely fits a shoulder 62 provided on an enlarged portion 64 on the end of the spindle adjacent the enlarged portion 40 of the stem.

The flat surface of the pad 58 opposite the plate 54 is bonded to a plate or washer member 66 which is substantially concentric with the plate 54 and has an aperture which closely fits a portion 68 on the spindle 38 adjacent to the outer end thereof. This plate 66 is clamped against a shoulder 70 on the spindle by a nut 72 which is screw threaded onto the end of the spindle. If desired, the spindle may be provided with a reduced portion 74 in radial alignment with the boss of the plate 54 in order to provide additional clearance between the spindle and this boss. Each of the pads 56 and 58 may include one or more reinforcing elements of thin metal as indicated at 76 and 78 respectively.

With this arrangement the loads between the engine and the mount ring 26 are transferred through the various resilient pads of the several mount brackets in a manner which suppresses certain of the vibrational forces of the power plant and insulates the mount ring from other vibrational forces so that the power plant vibrations are not transmitted in full force to the aircraft structure. All movements of the engine about the point of intersection of the center lines of the portions 38 of the various brackets will be resisted entirely in shear of the resilient material of the various flexible pads thus providing a relative soft cushion for insulating the in plane structure from these engine movements. Separating the two pads of each bracket in the manner indicated permits the use of a mount ring of smaller diameter positioned near the rearward ends of the bosses 22 and also facilitates the construction and assembly of the mount unit to such a degree that a flexible vibration suppressing mounting is made practical for even a low power inexpensive power plant installation.

In the modified form of the invention shown in Fig. 5 the construction and arrangement is the same as that shown in Fig. 3 and described above except that a cup shaped member 80 is substituted for the plate 54 in Fig. 5. The sides of this cup shaped member extend outwardly beyond the pad 58 and the member is externally threaded near its open end, as indicated at 82. The plate 66' is made flat with substantially parallel side walls and a friction disc 84 is placed against the outer surface of this plate with its periphery in contact with the inner surface of the cup shaped member 80. This friction disc is provided with a central aperture sufficiently large to provide the necessary clearance around the nut 72 which retains the plate 66' in position on the spindle 38 and is held in frictional contact with the adjacent surface of the plate 66' by a conical "Belleville washer" spring 86 the inner portion of which bears against a shoe 88 provided on the disc 84, and the outer portion of which is disposed beneath an annular nut 90 screw threaded onto the open end portion of the member 80. This spring is of the character particularly illustrated and described in my United States Patent No. 2,317,501, issued April 27, 1943, for Friction damped engine mounts, and is compressed by the nut 82 to a condition at which distortion of the spring occurs with extremely small variations in the load thereon so that the spring exercises a substantially constant force although it may be slightly distorted by compression and expansion of the material of the pads 56 and 58, thus maintaining the frictional damping force substantially constant. This frictional damping means, particularly shown in Fig. 5, will convert a considerable portion of the vibrational energy imposed on the mount into heat and thus dissipate the energy and reduce the amplitude of the vibrational movements while, at the same time, the flexible bracket member substantially insulates the mount ring 26 from the vibrational movements of the engine about the point at which the center lines of the bracket portions 38 intersect the axis of rotation of the engine. The angle between the portions 36 and 38 may be selected to bring the point of intersection of the center lines of the portions 38 with the rotational axis of the engine at any desired point along the rotational axis and may, if desired, bring this intersected point to a nodal point of engine movement incident to independent or opposed movements of the engine and propeller, as is particularly explained in my prior United States application Serial No. 480,813, filed March 27, 1943, for Engine suspension systems.

It is to be noted that, in the resilient pads shown in Fig. 3, only one reinforcing member is illustrated while, in the pads shown in Fig. 5, there are three reinforcing members in each pad. These numbers, however, are not restrictive as any number of reinforcing elements may be utilized and the elements may be spaced as is found necessary to provide the proper relationship between the shear resistance and the compression resistance of the pads to properly counteract both the forces causing shear distortion of the pads and those components which produce only compression in the pads.

While two suitable mechanical embodiments have been hereinabove described and illustrated in the accompanying drawings for the purpose of disclosing the invention, it is to be understood that the invention is not limited to the particular embodiments so illustrated and described, but that such changes in the size, shape and arrangement of the various parts may be resorted to as come within the scope of the sub-joined claims.

Having now described the invention so that others skilled in the art may clearly understand the same, what it is desired to secure by Letters Patent is as follows:

1. In a flexible engine mount for securing an engine to an engine support, a plurality of brackets angularly spaced about the axis of rotation of said engine each comprising, a cylindrical member attached to said support, a stem member attached to said engine and projecting therefrom through said cylindrical member with its center line in a plane including the axis of rotation of said engine and at an oblique angle with said axis of rotation, a plate overlying each end of said cylindrical member and centered relative thereto, a pad of resilient material bonded to each plate on the side thereof opposite said cylindrical member, an abutment washer bonded to each pad on the side thereof opposite the respective plate and rigidly secured to said stem member, and friction damping means between said stem and cylindrical members.

2. In combination with an engine having an annular series of mounting bosses provided with apertures having their center lines substantially parallel with the axis of rotation of said engine and a mount ring disposed adjacent to said series of bosses and substantially concentric therewith, a plurality of mounting brackets angularly spaced about said mount ring and interconnecting said ring and said engine, each bracket comprising, a cylindrical member secured to said mount ring and having its longitudinal center line intersecting the axis of rotation of said engine and inclined at an oblique angle to said axis of rotation, an integral two part stem having one part extending through and secured to an engine boss and the other part extending through a corresponding cylindrical member substantially parallel to the axis thereof, a flat pad of resilient material at each end of said cylindrical member, each pad having one major surface thereof secured to said cylindrical member and the other major surface thereof secured to said stem, and friction damping means between said stem and cylindrical members.

3. In a vehicle engine mount including a series of apertured engine lugs having the center lines of said apertures substantially parallel to the axis of rotation of said engine, and a mount ring adjacent to said lugs and having cylindrical bushings spaced opposite said lugs and so inclined that their longitudinal center lines intersect the axis of rotation of said engine at an acute angle; respective means interconnecting said engine lugs with corresponding ring carried bushings, each connecting means comprising, an integral metal stem member having two spindle portions disposed at an angle to each other and separated by an enlarged portion presenting radial shoulders normal to the center lines of the respective spindle portions, one of said spindle portions being receivable in an engine lug and the other spindle portion extending through the corresponding ring carried bushing, and a resilient pad at each end of said bushing having the spindle portion extending therethrough, each of said pads having one side thereof centered on and fixed relative to said bushing and the opposite side thereof centered on and fixed relative to said spindle portion.

4. The arrangement as set forth in claim 3 in which said interconnecting means are arranged in pairs and including a non-circular portion on each stem, and a link member extending between the two stems of each pair and engaging said non-circular portions at its ends to restrain said stems against rotation relative to said lugs.

5. The arrangement as set forth in claim 3 including an even number of respective interconnecting means arranged in pairs with the units of each pair connected by a link secured against rotation on each interconnecting means of the pair, and separated by an angular distance less than that separating adjacent units of separate adjacent pairs.

6. In a vehicle engine mount including a series of apertured engine lugs having the center lines of said apertures substantially parallel to the axis of rotation of said engine, and a mount ring adjacent to said lugs and having cylindrical bushings spaced opposite said lugs and so inclined that their longitudinal center lines intersect the axis of rotation of said engine at an acute angle; a bent metal stem member having a portion engaged in an engine lug and a portion extending through the corresponding ring carried bushing, resilient means connecting said stem with said bushing, a non-circular portion on each stem, and torsion arms engaging said non-circular portions of said stems to restrain said stems against rotary movements relative to said lugs.

7. In a vehicle engine mount including a series of apertured engine lugs having the center lines of said apertures substantially parallel to the axis of rotation of said engine, and a mount ring adjacent to said lugs and having cylindrical bushings spaced opposite to said lugs and so inclined that their longitudinal center lines intersect the axis of rotation of said engine at an acute angle; bent metal stem members each having a portion engaged in an engine lug and a portion extending through the corresponding ring carried bushing, resilient means connecting each stem with the corresponding bushing, a non-circular portion on each stem, and torsion arms engaging at their ends the non-circular portions of two adjacent stems to restrain said stems against rotary movements relative to said lugs.

8. A mounting bracket for connecting an engine to an engine mount ring comprising, a bent metal member including two bolt portions the center lines of which intersect at an oblique angle, an enlarged portion separating said bolt portions and presenting respective radial shoulders perpendicular to the respective center lines, a cylindrical bushing surrounding one of said bolt portions, a resilient unit at each end of said cylindrical bushing surrounding said one bolt portion, each resilient unit including an abutment plate centered on an end of said bushing, an abutment plate secured on said one bolt portion, and a pad of resilient material disposed between and bonded to said abutment plates, and friction damping means between said bolt and bushing.

9. A mounting bracket for connecting an engine to an engine mount ring comprising, a bent metal member including two bolt portions the center lines of which intersect at an oblique angle, an enlarged portion separating said bolt portions and presenting respective radial shoulders perpendicular to the respective center lines, a cylindrical bushing surrounding one of said bolt portions, and a resilient unit at each end of said cylindrical bushing and said one bolt portion, one of said resilient units including an abutment plate centered on one end of said bushing, an abutment plate secured on said one bolt portion and a pad of resilient material disposed between and bonded to said abutment plates, and the other of said resilient units comprising a cup shaped member centered on the other end of said bushing, an abutment plate secured on said one bolt member, a pad of resilient material disposed between the bottom of said cup shaped member and said abutment plate and bonded thereto, a friction disc in said cup shaped member overlying said abutment plate, a conical spring in said cup shaped member bearing on said friction disc, and an annular nut threaded on the open end of said cup shaped member and compressing said spring.

10. In a vehicle engine mount including a series of apertured engine lugs having the center lines of said apertures substantially parallel to the axis of rotation of said engine, and a mount ring adjacent to said lugs and having cylindrical bushings spaced opposite said lugs and so inclined that their longitudinal center lines intersect the axis of rotation of said engine at an acute angle; a bent metal stem member having a portion engaged in an engine lug and a portion extending through the corresponding ring carried bushing, a resilient unit at each end of said bushing and said stem, each unit comprising an abutment member centered on said bushing, an abutment member centered on said stem, and a pad of resilient material disposed between and bonded to said abutment members, and friction damping means between said bushing and said stem incorporated in one of said resilient units.

11. Resilient means for connecting an engine to an engine support having a cylindrical bushing thereon comprising, an engine attached member having a bolt portion extending through said bushing, spaced resilient units connecting said bolt portion and said bushing and disposed at opposite ends of said bushing, each unit including an end plate rigidly engaged with an end of said bushing, an end plate rigidly carried by said bolt portion, and a pad of resilient material disposed between and bonded to said end plates, and friction damping means between said bolt portion and bushing.

12. A radial engine mounting including an annular mounting ring having a plurality of angularly spaced brackets thereon, said mounting including a plurality of spaced mounts each engaging one of the brackets, each mount having a stem engaging the engine, such that the stems of adjacent mounts are substantially parallel, and a connecting link extending between adjacent mounts and secured against turning on each mount to absorb any torque on either mount.

13. A radial engine mounting including an annular mounting ring having a plurality of angularly spaced brackets thereon, said mounting including an even number of mounts each engaging one of the brackets and arranged in pairs with the mounts of each pair connected by a link secured against turning on each mount and separated by an angular distance less than that separating adjacent units of separate pairs, each mount having a stem engaging the engine and substantially parallel to the stem of the adjacent mount of the pair.

14. In combination with an engine having an annular series of mounting bosses and a mount ring disposed adjacent to said series of bosses and substantially concentric therewith, a plurality of mounting brackets angularly spaced about said mount ring and interconnecting said ring and said engine, each bracket comprising a cylindrical member secured to said mount ring and having its longitudinal center line intersecting the axis of rotation of said engine and inclined at an acute angle to said axis of rotation, a two part stem having one part extending through and secured to an engine boss and the other part extending through a corresponding cylindrical member substantially parallel to the axis thereof, a pad of resilient material at each end of said cylindrical member, each pad having one major surface thereof secured to said cylindrical member and the other major surface thereof secured to said stem, and friction damping means between said stem and cylindrical members.

15. In a vehicle engine mount including a series of apertured engine lugs and a mount ring adjacent to said lugs and having cylindrical bushings spaced opposite said lugs and so inclined that their longitudinal center lines intersect the axis of rotation of said engine at an acute angle, respective means connecting said engine lugs with corresponding ring carried bushings, each connecting means comprising a stem member having two spindle portions separated by an enlarged portion presenting radial shoulders normal to the center lines of the respective spindle portions, one of said spindle portions being receivably in an engine lug and the other spindle portion extending through the corresponding ring carried bushing, and a resilient pad at each end of said bushing having the spindle portion extending therethrough, each of said pads having one side thereof centered on and fixed relative to said bushing and the opposite side thereof centered on and fixed relative to said spindle portion.

16. A mounting bracket for connecting an engine to an engine mount ring comprising, an axial member including two bolt portions and an enlarged shoulder portion separating said bolt portions and presenting radial shoulders perpendicular to the respective center lines of said bolt portions, a cylindrical bushing surrounding one of said bolt portions, and a resilient unit at each end of said cylindrical bushing and said one bolt portion, one of said resilient units including an abutment plate centered on one end of said bushing, an abutment plate secured on said one bolt portion and a pad of resilient material disposed between and bonded to said abutment plates, and the other of said resilient units comprising a cup-shaped member centered on the other end of said bushing, an abutment plate secured on said one bolt member, a pad of resilient material disposed between the bottom of said cup-shaped member and said last mentioned abutment plate and bonded thereto, a friction disc in said cup-shaped member overlying the abutment plate therein, a conical spring in said cup member bearing at one end on said friction disc, and an inturned flange at the mouth of said cup-shaped member for supporting the other end of said spring.

17. In a vehicle engine mount including a series of apertured engine lugs and a mount ring adjacent to said lugs and having cylindrical bushings spaced opposite said lugs and so inclined that their longitudinal center lines intersect the axis of rotation of said engine at an acute angle, a stem member having a portion engaged in an engine lug and a second portion extending through the corresponding ring carried bushing, a resilient unit at each end of said bushing and said second stem portion, each unit comprising an abutment member centered on said bushing, an abutment member centered on said stem, and a pad of resilient material disposed between and bonded to said abutment members, and friction damping means between said bushing and said stem incorporated in one of said units.

JOHN M. TYLER.